(12) United States Patent
Glugla

(10) Patent No.: US 10,041,448 B2
(45) Date of Patent: Aug. 7, 2018

(54) SYSTEMS AND METHODS FOR BOOST CONTROL

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1087 days.

(21) Appl. No.: 14/307,165

(22) Filed: Jun. 17, 2014

(65) Prior Publication Data
US 2015/0361927 A1 Dec. 17, 2015

(51) Int. Cl.
*F02B 47/08* (2006.01)
*F02B 41/00* (2006.01)
(Continued)

(52) U.S. Cl.
CPC ......... *F02M 25/0749* (2013.01); *F02B 47/08* (2013.01); *F02D 13/0261* (2013.01); *F02D 41/0007* (2013.01); *F02D 41/008* (2013.01); *F02M 26/01* (2016.02); *F02M 26/08* (2016.02); *F02M 26/43* (2016.02); *F02M 35/108* (2013.01); *F02B 2075/125* (2013.01); *F02D 2041/001* (2013.01); *Y02T 10/123* (2013.01); *Y02T 10/144* (2013.01); *Y02T 10/18* (2013.01)

(58) Field of Classification Search
CPC .......... F02B 2075/125; F02B 47/08; F02D 13/0261; F02D 2041/001; F02D 41/0007; F02D 41/008; F02D 41/0065; F02D 37/02; F02M 25/0749; F02M 26/01; F02M 26/08; F02M 26/43; F02M 35/108; Y02T 10/123; Y02T 10/144; Y02T 10/18

USPC ..................................... 60/605.2; 123/406.26
See application file for complete search history.

(56) References Cited

U.S. PATENT DOCUMENTS 5,279,515 A 1/1994 Moore et al.
5,746,189 A 5/1998 Kuzuya et al.
(Continued)

FOREIGN PATENT DOCUMENTS

WO 2014005127 A2 1/2014

OTHER PUBLICATIONS

Potteau, Sebastian et al., "Cooled EGR for a Turbo SI Engine to Reduce Knocking and Fuel Consumption," SAE Technical Paper Series No. 2007-01-3978, Powertrain & Fluid Systems Conference and Exhibition, Rosemont, Ill., Oct. 29-Nov. 1, 2007, 13 pages.

(Continued)

*Primary Examiner* — Mark Laurenzi
*Assistant Examiner* — Paul Thiede
(74) *Attorney, Agent, or Firm* — Julia Voutyras; McCoy Russell LLP

(57) ABSTRACT

Methods and systems are provided for reducing turbo lag in an engine system configured with a cylinder dedicated for exhaust gas recirculation and distinct turbines coupled to the dedicated EGR cylinder and remaining engine cylinders. An air-fuel ratio of combustion in the dedicated cylinder is adjusted responsive to a tip-in event by providing blow-through air and additional fuel based on the amount of heat required to spin up a turbine coupled to the dedicated cylinder and provide the requested boost pressure. The approach enables turbo lag to be reduced while providing high EGR at high boost conditions.

17 Claims, 6 Drawing Sheets

(51) Int. Cl.

| | | |
|---|---|---|
| *F02M 35/108* | (2006.01) | |
| *F02D 13/02* | (2006.01) | |
| *F02D 41/00* | (2006.01) | |
| *F02M 26/43* | (2016.01) | |
| *F02M 26/08* | (2016.01) | |
| *F02M 26/01* | (2016.01) | |
| *F02B 25/12* | (2006.01) | |
| *F02M 25/07* | (2006.01) | |
| *F02B 75/12* | (2006.01) | |

(56) References Cited

U.S. PATENT DOCUMENTS

| | | |
|---|---|---|
| 6,053,154 A | 4/2000 | Pott |
| 6,138,650 A | 10/2000 | Bailey |
| 6,230,695 B1 | 5/2001 | Coleman et al. |
| 6,293,246 B1 | 9/2001 | Tanahashi et al. |
| 6,397,790 B1 | 6/2002 | Collier, Jr. |
| 6,405,720 B1 | 6/2002 | Collier, Jr. |
| 6,499,449 B2 | 12/2002 | Michelini et al. |
| 6,543,230 B1 | 4/2003 | Schmid |
| 6,655,324 B2 | 12/2003 | Cohn et al. |
| 6,820,415 B2 | 11/2004 | Abet et al. |
| 6,925,802 B2 | 8/2005 | Arnold |
| 6,968,825 B2 | 11/2005 | Hitomi et al. |
| 7,290,504 B2 | 11/2007 | Lange |
| 7,779,812 B2 | 8/2010 | Leone et al. |
| 7,942,127 B2 | 5/2011 | Leone et al. |
| 8,041,500 B2 | 10/2011 | Leone |
| 8,108,125 B2 | 1/2012 | Leone |
| 8,150,605 B2 | 4/2012 | Doering et al. |
| 8,239,122 B2 | 8/2012 | Leone et al. |
| 8,291,891 B2 | 10/2012 | Alger, II et al. |
| 8,352,160 B2 | 1/2013 | Leone |
| 8,352,164 B2 | 1/2013 | Leone et al. |
| 8,511,084 B2 | 8/2013 | Ulrey et al. |
| 8,539,768 B2 | 9/2013 | Hayman et al. |
| 8,561,599 B2 | 10/2013 | Gingrich et al. |
| 8,701,409 B2 | 4/2014 | Pursifull et al. |
| 8,763,570 B2 | 7/2014 | Hayman et al. |
| 2009/0308070 A1 | 12/2009 | Alger, II et al. |
| 2011/0041495 A1 | 2/2011 | Yager |
| 2011/0253113 A1 | 10/2011 | Roth et al. |
| 2012/0023937 A1 | 2/2012 | Styles et al. |
| 2012/0078492 A1 | 3/2012 | Freund et al. |
| 2012/0204844 A1 | 8/2012 | Gingrich et al. |
| 2012/0260897 A1 | 10/2012 | Hayman et al. |
| 2012/0285163 A1 | 11/2012 | Hayman et al. |
| 2012/0285426 A1 | 11/2012 | Hayman et al. |
| 2012/0285427 A1 | 11/2012 | Hayman et al. |
| 2013/0220288 A1* | 8/2013 | Klingbeil ............ F02D 41/0065 60/605.2 |
| 2014/0196703 A1 | 7/2014 | Boyer et al. |
| 2015/0354477 A1* | 12/2015 | Leone .................... F02D 37/02 123/406.26 |

OTHER PUBLICATIONS

Alger, Terry et al., "Dedicated EGR: A New Concept in High Efficiency Engines," SAE Technical Paper Series No. 2009-01-0694, Southwest Research Institute, 12 pages.

Ulrey, Joseph N. et al., "Dedicated EGR Cylinder Post Combustion Injection," U.S. Appl. No. 13/915,445, filed Jun. 11, 2013, 34 pages.

Leone, Thomas G. et al., "Systems and Methods for Dedicated EGR Cylinder Valve Control," U.S. Appl. No. 14/297,232, filed Jun. 5, 2014, 36 pages.

Leone, Thomas G. et al., "Systems and Methods for EGR Control," U.S. Appl. No. 14/298,733, filed Jun. 6, 2014, 45 pages.

Leone, Thomas G. et al., "Systems and Methods for Improving Operation of a Highly Dilute Engine," U.S. Appl. No. 14/271,248, filed May 6, 2014, 40 pages.

Martin, Douglas R. et al., "Method and System for EGR Control," U.S. Appl. No. 14/327,379, filed Jul. 9, 2014, 48 pages.

* cited by examiner

| Operating Condition | DEGR_Air | DEGR_Fuel |
|---|---|---|
| Condition 1 (EGR requested, combustion stabililty not limited) | | |
| Condition 2 (EGR requested, combustion stabililty limited) | | |
| Condition 3 (Boost requested, combustion stability not limited) | | |
| Condition 4 (Boost and EGR requested, combustion stability limited) | | |

FIG. 4

SYSTEMS AND METHODS FOR BOOST CONTROL

FIELD

The present description relates to systems and methods for improving boost control in engine systems configured with a sole cylinder for providing external EGR to other engine cylinders.

BACKGROUND AND SUMMARY

Engines may be configured with exhaust gas recirculation (EGR) systems to divert at least some exhaust gas from an engine exhaust manifold to an engine intake manifold. By providing a desired engine dilution, such systems reduce engine knock, throttling losses, as well as NOx emissions. In addition, fuel economy is improved, especially at higher levels of engine boost.

Engines have also been configured with a sole cylinder (or cylinder group) that is dedicated for providing external EGR to other engine cylinders. Additionally, internal combustion engines often include a turbocharger assembly. The turbocharger assembly uses the flow of exhaust gas to spin a turbine, which in turn drives a compressor that compresses the combustion air that is supplied to the intake manifold. When the exhaust gas from a predetermined number of the cylinders of the internal combustion engine is dedicated to the intake manifold for EGR purposes, thereby bypassing the turbocharger assembly, the flow rate of the exhaust gas available to the turbine of the turbocharger is reduced, which reduces the maximum power output of the internal combustion engine. In addition, the engine may suffer from turbo lag.

One example of a dedicated EGR cylinder system where this boost issue is addressed is shown by Hayman et al. in U.S. Pat. No. 8,539,768. Therein, the turbocharger assembly includes a bypass valve selectively coupling a dedicated EGR cylinder group to an exhaust turbine. During conditions when higher boost is required, the bypass valve may be opened so that exhaust gas from dedicated EGR cylinders can be used in combination with exhaust gas from remaining engine cylinders to spin the exhaust turbine. In comparison, during conditions when boost demand is lower, the bypass valve may be closed so that exhaust gas from the dedicated EGR cylinders is only used for EGR purposes and only the exhaust gas from the remaining engine cylinders is used to spin the exhaust turbine. In still other engine systems, turbo lag may be addressed through the use of air that is blown through one or more cylinders operating with valve overlap. By concurrently adjusting (e.g., enriching) the fueling of the cylinders operating with valve overlap, an amount and temperature of charge delivered to the turbine can be raised, thereby expediting turbine spin-up.

However, the inventors herein have identified potential issues with such approaches. As an example, in engine systems operating with a blow-through mode, the eventual flow of the blow-through air over the exhaust catalyst can lead to a drop in catalyst efficiency and exhaust emissions issues. As another example, in engine systems operating with a bypass valve selectively coupling the dedicated EGR cylinder group to the exhaust turbine, the use of EGR is limited to conditions when boost demand is low. In other words, high EGR availability and high boost availability may be mutually exclusive since the exhaust gas from the dedicated cylinder group can either be routed for EGR purposes or routed for turbine spin-up purposes. As such, EGR may be desired at higher engine boost levels to improve fuel economy and reduce NOx emissions.

In one example, the above issues may be at least party addressed by a method for an engine, comprising: operating a dedicated EGR cylinder group with rich cylinder combustion and more blow-through air than remaining engine cylinders, the dedicated EGR cylinder group recirculating exhaust gas to an engine intake via a first turbine, the first turbine distinct from a second turbine receiving exhaust gas from remaining engine cylinders. In this way, an exotherm can be generated at the turbine downstream of the dedicated EGR cylinder group, and boost development can be expedited.

As an example, exhaust from a dedicated EGR (DEGR) cylinder group of a multi-cylinder engine may be passed through a water gas shift (WGS) catalyst and then through a first, smaller exhaust turbine before the exhaust is recirculated to all engine cylinders. Exhaust from the remaining engine cylinders, in comparison, is passed through a second, larger turbine before being released through the tailpipe. Fueling of the DEGR cylinder group may be enriched during conditions when engine combustion stability is limited so that the WGS catalyst can create hydrogen-enriched exhaust for recirculation to the engine. The first turbine may drive a first, smaller compressor that is positioned upstream of a second, larger compressor, the second compressor driven by the second turbine.

In response to an operator pedal tip-in event, an amount of blow-through air delivered to the DEGR cylinder group may be selectively increased. Specifically, a variable cam timing device may be actuated, such as a faster actuating electric cam phaser, to adjust a timing of the intake and exhaust valves of only the DEGR cylinder group to a timing that provides increased positive intake to exhaust valve overlap (e.g., full valve overlap). At the same time, fueling of the DEGR cylinder group may be adjusted based on the blow-through air amount to provide an overall rich combustion. Alternatively, one or more post fuel injections may be added (e.g., in the exhaust stroke of the given combustion event). The degree of richness may be adjusted based on the boost demand relative to the boost pressure (or turbine speed) at the time of tip-in. In doing so, an exotherm is generated at the first turbine, expediting turbine spin-up. By spinning up the first turbine, boost provided by the first and second compressors may be increased, reducing turbo lag. The operation of the DEGR cylinder with increased blow-through air and increased richness of combustion may be continued until the first turbine is sufficiently spun up, or boost pressure is sufficiently high. Thereafter, the blow-though air amount may be reduced and DEGR cylinder group fueling may be adjusted based on engine operating conditions including EGR demand and combustion stability.

In this way, an engine configuration is provided where blow-through air delivery to a dedicated EGR cylinder group can be selectively and transiently increased. By concurrently using rich fuel injection, an exotherm can be generated at a turbine downstream of the DEGR cylinder group, expediting boost pressure development. Since the exhaust from the DEGR cylinder group is delivered to the engine intake, and not the engine exhaust, the blow-through air does not degrade the exhaust catalyst efficiency, thereby averting emissions issues otherwise associated with the use of blow-through air. By using the exhaust energy from a dedicated EGR cylinder group to run a dedicated turbine, exhaust energy from the dedicated cylinder group can be efficiently captured for creating boost, even at lower engine speeds. In addition, a smaller turbine can be used to reduce turbo lag. The use of a smaller turbine wheel results in less inertia, thereby allowing the maximum boost output to be achieved faster.

Furthermore, the reduction in exhaust temperature across the turbocharger results in lower temperature EGR being recirculated, which is advantageous for slowing combustion and controlling knock on cylinders ingesting the EGR. By using rich exhaust from a dedicated EGR cylinder to spin up a smaller turbine while stoichiometric exhaust from remaining engine cylinders to spin up a larger turbine, turbo lag can be reduced during a tip-in. By recirculating the rich exhaust from the dedicated EGR cylinder to remaining engine cylinders after the exhaust flows past the first turbine, EGR can be provided to the engine even during higher boost levels without degrading combustion stability. Overall, turbo lag can be rapidly reduced without affecting engine exhaust emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 4 shows example air and fuel profiles for a dedicated EGR cylinder group applied at different engine operating conditions.

DETAILED DESCRIPTION

Figure 1:
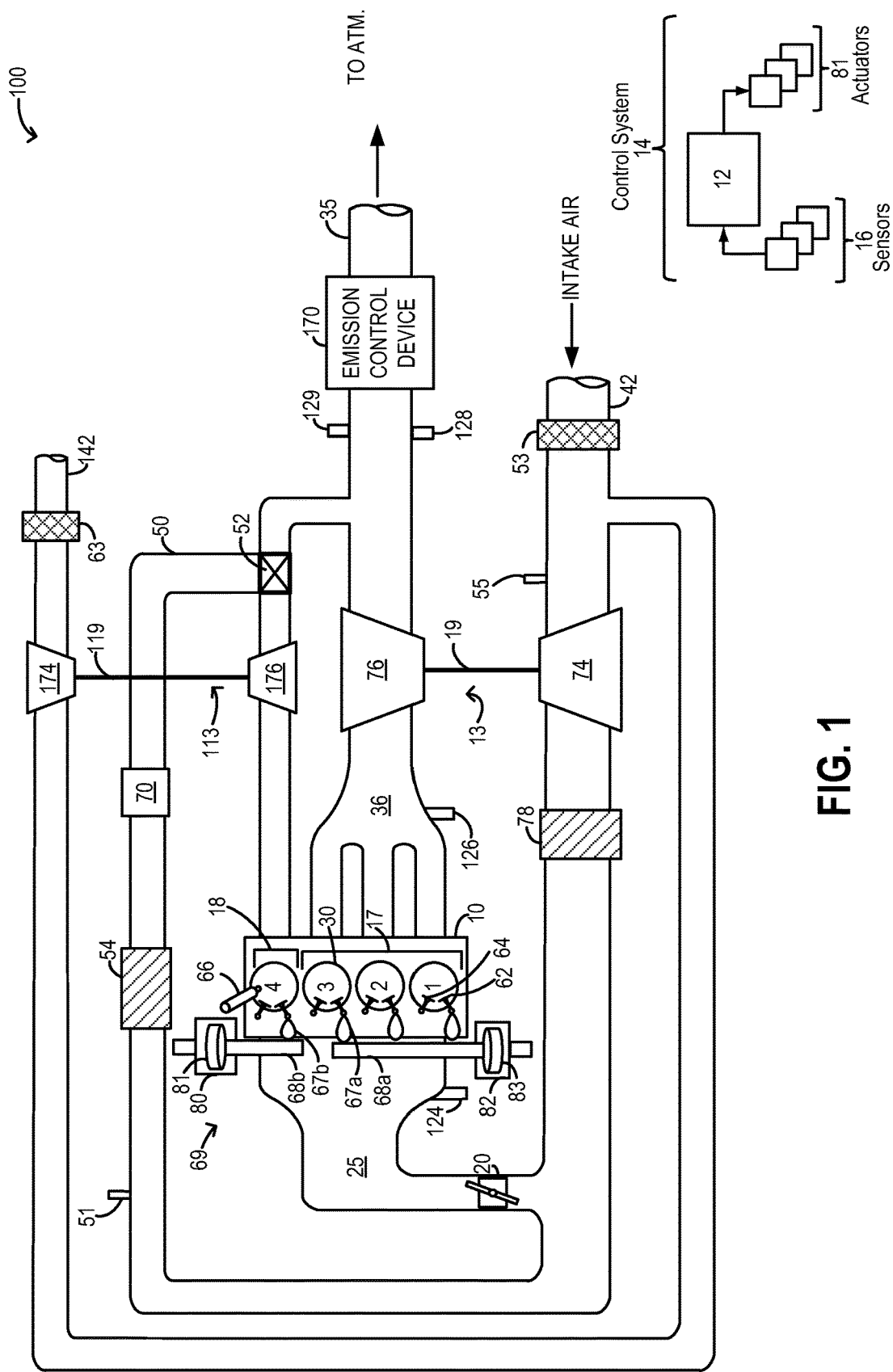
FIG. 1 is a schematic diagram of a boosted engine system including a dedicated EGR donating cylinder group.
Figure 2:
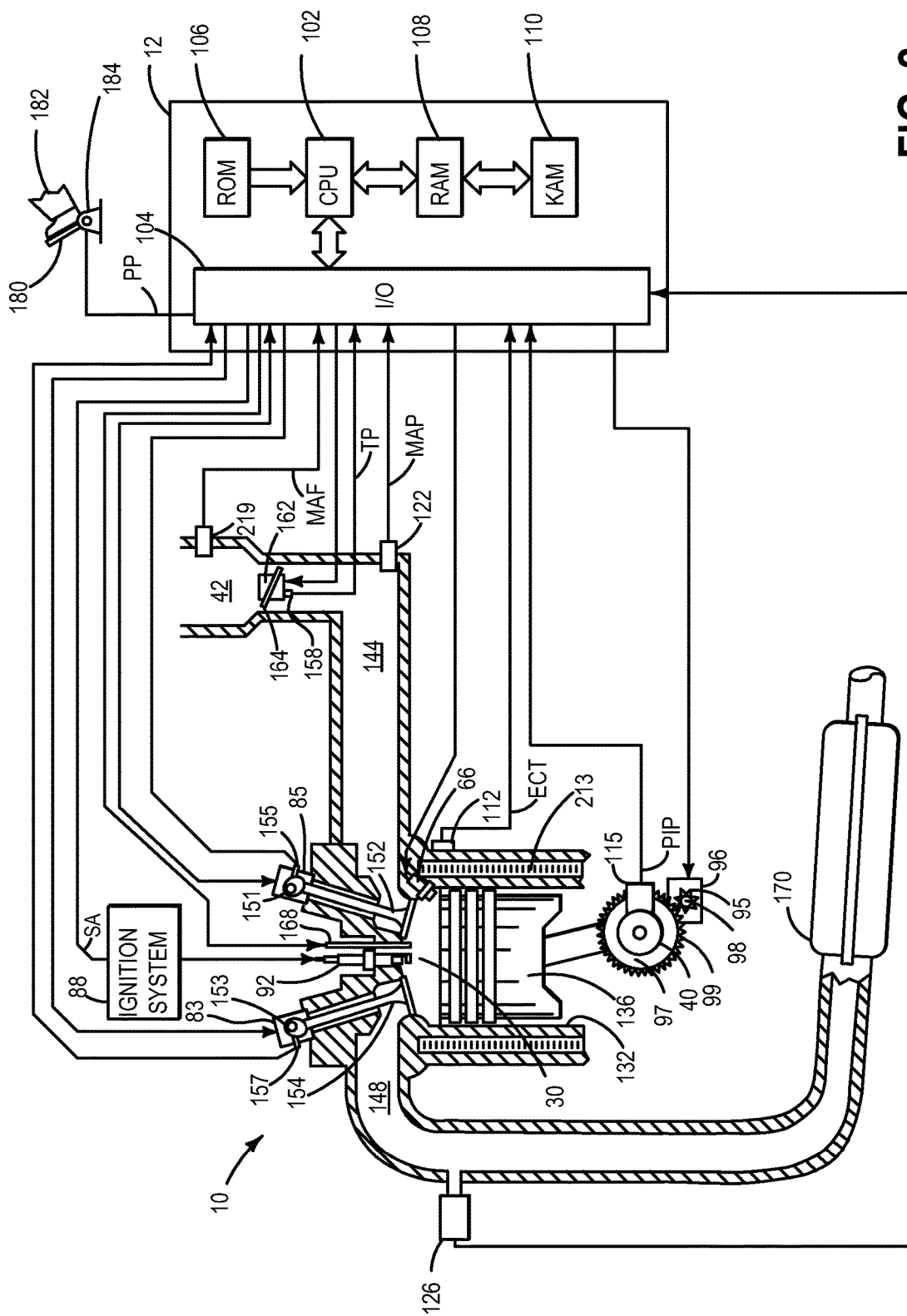
FIG. 2 is a schematic depiction of a combustion chamber of the engine.

The present description is related to boost control on an engine operating with highly diluted cylinder mixtures, such as the engine systems of FIGS. 1-2. The engine cylinder mixtures may be diluted using recirculated exhaust gases (EGR) that are byproducts of combusting air-fuel mixtures. A controller may be configured to perform a control routine, such as the routine of FIG. 3, to operate a dedicated EGR cylinder group with rich fuel combustion and increased blow-through air in response to an increase in boost demand. Example air-fuel profiles that may be applied to the dedicated EGR cylinder group are shown at FIG. 4. The controller may also perform a routine, such as the routine of FIG. 5, to adjust a target air-fuel ratio of combustion of the dedicated EGR cylinder group in response to an increase in boost demand, such as during a tip-in event, to expedite turbine spin-up. In this way, turbo lag can be addressed while continuing to provide EGR at high boosted conditions. An example fueling and air-fuel ratio adjustment for boost control is shown with reference to FIG. 6.

FIG. 1 schematically shows aspects an example engine system 100 including an engine 10 with four cylinders (1-4). As elaborated herein, the four cylinders are arranged as a first cylinder group 17 consisting of non-dedicated EGR cylinders 1-3 and a second cylinder group 18 consisting of dedicated EGR cylinder 4. A detailed description of each combustion chamber of engine 10 is provided with reference to FIG. 2. Engine system 100 may be coupled in a vehicle, such as a passenger vehicle configured for road travel.

In the depicted embodiment, engine 10 is a boosted engine coupled to a first, smaller turbocharger 113 and a second, larger turbocharger 13. Specifically, first turbocharger 113 includes a first, smaller compressor 174 driven by a first, smaller turbine 176. Specifically, fresh air is introduced along intake passage 142 into engine 10 via air cleaner 63 and flows to compressor 174. In some embodiments, a flow rate of ambient air that enters the intake system through intake air passage 142 can be controlled at least in part by adjusting an air intake system throttle (not shown) positioned upstream of compressor 174. Compressor 174 may be any suitable intake-air compressor, such as a motor-driven or driveshaft driven supercharger compressor. In engine system 10, however, the compressor is a turbocharger compressor mechanically coupled to turbine 176 via a shaft 119, the turbine 176 driven by expanding engine exhaust released exclusively from the dedicated cylinder group 18 (herein cylinder 4). As elaborated herein, by adjusting a combustion air-fuel ratio of dedicated cylinder group 18, a temperature and air-fuel ratio of exhaust directed through first turbine 176 may be varied responsive to changes in boost demand to reduce turbo lag.

Second turbocharger 13 includes a second, larger compressor 74 driven by a second, larger turbine 76. Specifically, fresh air is introduced along intake passage 42 into engine 10 via air cleaner 53 and flows to compressor 174. A flow rate of ambient air that enters the intake system through intake air passage 42 can be controlled at least in part by adjusting intake throttle 20. Furthermore, an additional induction system intake throttle (not shown) may be provided in intake passage 42 upstream of compressor 74. In this way, intake passages 42 and 142 comprise parallel air intake branches of the engine's intake system. Compressor 74 may be any suitable intake-air compressor, such as a motor-driven or driveshaft driven supercharger compressor. In engine system 10, however, the compressor is a turbocharger compressor mechanically coupled to turbine 76 via a shaft 19, the turbine 76 driven by expanding engine exhaust released exclusively from the non-dedicated cylinder group 17 (herein cylinders 1-3). In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 74 is coupled, through charge-air cooler 78 to intake throttle 20. Intake throttle 20 is coupled to engine intake manifold 25. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 124. A flow rate of the aircharge received in the intake manifold via intake passage 42 may be sensed by manifold air flow (MAF) sensor 55. A compressor by-pass valve (not shown) may be coupled in series between the inlet and the outlet of compressor 74. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 25 is coupled to a series of combustion chambers 30 through a series of intake valves (see FIG. 2). The combustion chambers are further coupled to exhaust manifold 36 via a series of exhaust valves (see FIG. 2). In the depicted embodiment, exhaust manifold 36 includes a plurality of exhaust manifold sections to enable effluent from different combustion chambers to be directed to different locations in the engine system. In particular, effluent from the first cylinder group 17 (cylinders 1-3) is directed through larger turbine 76 of exhaust manifold 36 before being processed by an exhaust catalyst of emission control device 170. Exhaust from the second cylinder group 18 (cylinder 4), in comparison, is directed through smaller turbine 176 before being routed back to intake manifold 25 via exhaust gas recirculation (EGR) passage 50, and exhaust catalyst 70. Alternatively, at least a portion of exhaust from the second cylinder group may be directed to exhaust tailpipe 35, at a location upstream of emission control device 170, via diverter valve 52. In still further embodiments, the portion of exhaust diverted via diverter valve 52 may be routed to exhaust tailpipe 35 upstream of turbine 76. Therein, by adjusting a position and opening of diverter valve 52, a proportion of exhaust directed from cylinder 4 to the exhaust manifold relative to the intake manifold may be varied. For example, during engine cold-start conditions, exhaust from cylinder 4 may be redirected to emission control device 170 to expedite exhaust catalyst activation.

Exhaust catalyst 70 positioned in EGR passage 50 may be distinct from exhaust catalyst 170 positioned in exhaust tailpipe 35. Specifically, exhaust catalyst 70 coupled downstream of the dedicated EGR cylinder group may be configured as a water gas shift (WGS) catalyst. WGS catalyst 70 may be configured to generate hydrogen gas from exhaust gas hydrocarbons received in passage 50 from cylinder 4. In comparison, exhaust catalyst 170 coupled downstream of the non-dedicated EGR cylinder group may be configured for exhaust gas treatment before release of exhaust gas to the atmosphere via the tailpipe.

Each of cylinders 1-4 may include internal EGR by trapping exhaust gases from a combustion event in the respective cylinder and allowing the exhaust gases to remain in the respective cylinder during a subsequent combustion event. The amount of internal EGR may be varied via adjusting intake and/or exhaust valve opening and/or closing times. For example, by increasing intake and exhaust valve overlap, additional EGR may be retained in the cylinder during a subsequent combustion event. External EGR is provided to cylinders 1-4 solely via exhaust flow from the second cylinder group 18 (herein, cylinder 4) and EGR passage 50. In another example, external EGR may only be provided to cylinders 1-3 and not to cylinder 4. External EGR is not provided by exhaust flow from cylinders 1-3. Thus, in this example, cylinder 4 is the sole source of external EGR for engine 10 and therefore is also referred to herein as the dedicated EGR cylinder (or dedicated cylinder group). Cylinders 1-3 are also referred to herein as a non-dedicated EGR cylinder group. While the current example shows the dedicated EGR cylinder group as having a single cylinder, it will be appreciated that in alternate engine configurations, the dedicated EGR cylinder group may have more engine cylinders.

EGR passage 50 may include an EGR cooler 54 for cooling EGR delivered to the engine intake. In addition, EGR passage 50 may include a first exhaust gas sensor 51 for estimating an air-fuel ratio of the exhaust recirculated from the second cylinder group to the remaining engine cylinders. A second exhaust gas sensor 126 may be positioned downstream of the exhaust manifold sections of the first cylinder group for estimating an air-fuel ratio of exhaust in the first cylinder group. Still further exhaust gas sensors may be included in the engine system of FIG. 1.

A hydrogen concentration in external EGR from cylinder 4 may be adjusted by varying the air-fuel ratio of combustion in cylinder 4. For example, the hydrogen concentration of external EGR from cylinder 4 may be increased by enriching an air-fuel mixture combusted in cylinder 4. Therein, the amount of hydrogen gas generated at WGS exhaust catalyst 70 may be increased by increasing the degree of richness of exhaust received in passage 50 from cylinder 4. Thus, to provide hydrogen enriched exhaust to engine cylinders 1-4, fueling of the second cylinder group 18 may be adjusted so that cylinder 4 is enriched. In one example, the hydrogen concentration of the external EGR from cylinder 4 may be increased during conditions when engine combustion stability is less than desired. This action increases hydrogen concentration in external EGR and it may improve engine combustion stability, especially at lower engine speeds and loads (e.g., idle). In addition, the hydrogen enriched EGR allows much higher levels of EGR to be tolerated in the engine, as compared to conventional (lower hydrogen concentration) EGR, before encountering any combustion stability issues. By increasing the range and amount of EGR usage, engine fuel economy is improved. As another example, the hydrogen concentration of external EGR from cylinder 4 may be decreased by enleaning an air-fuel mixture combusted in cylinder 4. Therein, the amount of hydrogen gas generated at WGS exhaust catalyst 70 may be decreased by increasing the degree of leanness of exhaust received in passage 50 from cylinder 4. In one example, the hydrogen concentration of the external EGR from cylinder 4 may be decreased during conditions when lower engine dilution is required.

Combustion chambers 30 may be supplied one or more fuels, such as gasoline, alcohol fuel blends, diesel, biodiesel, compressed natural gas, etc. Fuel may be supplied to the combustion chambers via injector 66. Fuel injector 66 may draw fuel from fuel tank 26. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

Each cylinder 30 may be serviced by one or more valves. In the present example, each cylinder 30 includes a corresponding intake valve 62 and an exhaust valve 64. Engine system 100 further includes one or more camshafts 68 for operating intake valve 62 and/or exhaust valve 64. In the depicted example, intake camshaft 68b is coupled to intake valve 62 of the second cylinder group and can be actuated to operate intake valve 62 of the second cylinder group (that is, cylinder 4). In comparison, intake camshaft 68a is coupled to the intake valve of the first cylinder group and can be actuated to operate intake valve 62 of the first cylinder group (that is, cylinders 1-3). In the depicted embodiment, the intake valve of all cylinders of the first cylinder group are coupled to a common camshaft, such that intake camshaft 68a can be actuated to operate the intake valves of all the coupled cylinders.

Each intake valve 62 is actuatable between an open position that allows intake air into the corresponding cylinder and a closed position substantially blocking intake air from the cylinder. Intake camshafts 68a and 68b may be included in intake valve actuation system 69. Intake camshaft 68a includes intake cams 67a which have a cam lobe profile for opening intake valve 62 of the first cylinder group for a defined intake duration. Likewise, intake camshaft 68b includes intake cam 67b which has a cam lobe profile for opening intake valve 62 of the second cylinder group for a defined intake duration. The intake duration of the different cylinder groups may be the same or may be different. In some embodiments (not shown), the camshafts may include additional intake cams with an alternate cam lobe profile that allows the intake valve 62 to be opened for an alternate duration (herein also referred to as a cam profile switching system). Based on the lobe profile of the additional cam, the alternate duration may be longer or shorter than the defined intake duration of intake cam 67a, 67b. The lobe profile may affect cam lift height, cam duration, and/or cam timing. A controller may be able to switch the intake valve duration by moving intake camshafts 68a, 68b longitudinally and switching between cam profiles.

In the same manner, each exhaust valve 64 is actuatable between an open position allowing exhaust gas out of the corresponding cylinder and a closed position substantially retaining gas within the cylinder. It will be appreciated that while only intake valve 62 is shown to be cam-actuated, exhaust valve 64 may also be actuated by a similar exhaust camshaft (not shown). In some embodiments, where the exhaust valve of a plurality of cylinders 30 is coupled to a common camshaft, the exhaust camshaft can be actuated to operate the exhaust valves of all the coupled cylinders. As with intake camshaft 68, when included, the exhaust camshaft may include an exhaust cam having a cam lobe profile for opening exhaust valve 64 for a defined exhaust duration. In some embodiments, the exhaust camshaft may further include additional exhaust cams with an alternate cam lobe profile that allows exhaust valve 64 to be opened for an alternate duration. The lobe profile may affect cam lift height, cam duration, and/or cam timing. A controller may be able to switch the exhaust valve duration by moving the exhaust camshaft longitudinally and switching between cam profiles.

Intake valve actuation system 69 and exhaust valve actuation system (not shown) may further include push rods, rocker arms, tappets, etc. Such devices and features may control actuation of the intake valve 62 and the exhaust valve 64 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 30 may each have more than one exhaust valve and/or intake valve. In still other examples, each of the exhaust valve 64 and intake valve 62 of one or more cylinders may be actuated by a common camshaft. Further still, in some examples, some of the intake valves 62 and/or exhaust valves 64 may be actuated by their own independent camshaft or other device.

Engine system 100 may include variable valve timing systems, for example, variable cam timing VCT systems 80 and 82. Each variable valve timing system may be configured to open a first valve for a first duration during a first operating mode. The first operating mode may occur at an engine load below a part engine load threshold. Further, the variable valve timing system may be configured to open the first valve for a second duration, shorter than the first duration, during a second operating mode. The second operating mode may occur at an engine load above an engine load threshold and an engine speed below an engine speed threshold (e.g., during low to mid engine speeds).

VCT system 80 may be a twin independent variable camshaft timing system, for changing intake valve timing and exhaust valve timing independently of each other. VCT systems 80, 82 include intake camshaft phasers 81, 83, respectively, coupled to the corresponding intake camshaft for changing intake valve timing. The VCT systems may likewise include an exhaust camshaft phaser coupled to a common exhaust camshaft for changing exhaust valve timing. VCT systems 80, 82 may be configured to advance or retard valve timing by advancing or retarding cam timing and may be controlled by controller 12. VCT systems 80, 82 may be configured to vary the timing of valve opening and closing events by varying the relationship between the crankshaft position and the camshaft position. For example, VCT system 80 may be configured to rotate intake camshaft 68b independently of the crankshaft to cause the valve timing to be advanced or retarded. In some embodiments, VCT systems 80, 82 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT systems 80, 82. Each cylinder group, or cylinder, may have a dedicated cam phaser. In the depicted example, VCT system 80 coupled to the second dedicated EGR cylinder group may have a relatively faster actuating cam phasing device (such as an electric cam phaser) while VCT system 82 coupled to the first non-dedicated EGR cylinder group may have a relatively slower actuating cam phasing device (such as a hydraulic cam phaser). As elaborated herein at FIG. 3, the variable speed of valve actuation allows the engine system to transiently operate the dedicated EGR cylinder group with more blow-through air. In still other examples, the cylinder groups may be operated via a common cam actuation system but with a separate phaser for the DEGR cylinder group so that the cam of the DEGR cylinder group can be quickly moved to provide blow-through timing for the DEGR cylinder only, the cam then repositioned to normal timing for the non-DEGR cylinders.

During engine operation, a cylinder piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke. During cylinder combustion, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

Based on the timing differences between exhaust valve closing and intake valve opening, the valves may be operated with negative valve overlap wherein for a short duration after the end of the exhaust stroke and before the commencement of the intake stroke, both intake and exhaust valves are closed. This period, during which both valves are closed, is referred to as negative (intake to exhaust) valve overlap. In one example, the VCT system may be adjusted so that the negative intake to exhaust valve overlap timing may be a default cam position of the engine during cylinder combustion, such as during an engine cold-start.

Alternatively, the valves may be operated with positive valve overlap wherein for a short duration before the end of the exhaust stroke and after the commencement of the intake stroke, both intake and exhaust valves may be open. This period, during which both valves may be open, is referred to as a positive (intake to exhaust) valve overlap. As elaborated herein, the VCT systems 80, 82 may be adjusted during selected engine operating conditions to increase positive valve overlap. Specifically, a position of the intake camshaft may be adjusted such that an opening of the intake valve timing is advanced. Consequently, the intake valve may be opened earlier before the end of the exhaust stroke and a duration over which both valves are open may be increased, leading to more positive valve overlap. As one example, positive valve overlap may be increased by moving the intake camshaft from a position of some positive valve overlap to a position having more positive valve overlap. As another example, positive valve overlap may be increased by moving the intake camshaft from a position of negative valve overlap to a position of positive valve overlap. Further, the increase in positive overlap applied for the dedicated EGR cylinder group may differ from that applied to the remaining engine cylinders.

It will be appreciated that while the above example suggests increasing positive valve overlap by advancing intake opening timing, in alternate examples, positive valve overlap may be increased by adjusting an exhaust camshaft to retard exhaust valve closing. Further still, each of the intake and the exhaust camshafts may be adjusted to vary the positive valve overlap by varying both the intake and the exhaust valve timings.

In engine system 100, during periods of rapidly increasing engine load, such as immediately after start-up, upon tip-in, or upon exiting DFSO, the amount of intake air compression provided by the compressors may be inadequate. During at least some of these conditions, the amount of boost pressure available from the compressor may be limited due to the turbines not being spun up to a sufficiently high rotational speed (for example, due to low exhaust temperature or pressure). As such, the time required for the turbine to spin up and drive the compressor to provide the required amount of compressed intake air is referred to as turbo lag. During turbo-lag, the amount of torque provided may not match the torque demand, leading to a drop in engine performance.

To expedite turbine spin-up and reduce turbo lag, the engine may be operated in a blow-through mode during those conditions. In particular, as elaborated herein with reference to FIGS. 3-4, the dedicated EGR cylinder group may be operated with more blow-through air than remaining engine cylinders. Therein, an amount of intake air, herein also referred to as blow-through air, may be directed from the intake manifold to the exhaust manifold, while concurrently adjusting cylinder fueling, to provide extra mass flow for spinning up the turbine. For example, fuel injection may be enriched commensurate with the blow-through air amount to provide extra enthalpy for spinning up the turbine. Based on engine operating conditions prevalent at the time blow-through air is requested, an amount of valve overlap is adjusted so that the required amount of blow-through air can be provided to the turbine via the dedicated EGR cylinder group through positive valve overlap.

For example, to provide the blow-through via the second (DEGR) cylinder group, VCT system 80 may be adjusted from a first or initial position of reduced positive valve overlap (e.g., no positive valve overlap) to a second or final position having increased positive valve overlap. In one example, the final position may be a position of full valve overlap (or maximum positive valve overlap). While the methods herein discuss providing blow-through air always via positive valve overlap, in alternate embodiments, blow-through air may be provided via positive valve overlap only if the valve timing for providing positive valve overlap does not degrade engine fuel economy, combustion stability, and torque output. As discussed above, in alternate examples, instead of distinct VCT systems for each cylinder group, each of the DEGR and non DEGR cylinder groups may be operated with a common VCT system having distinct phasers for the different cylinder groups. This allows the cam timing of the DEGR cylinder group to be adjusted for blow-through while resuming normal valve timing for the remaining cylinders.

Exhaust from dedicated EGR cylinder 4 is directed to turbine 176 to drive the turbine, which in turn drives compressor 176 and increases intake boost pressure. Exhaust from dedicated EGR cylinder 4, after passing through turbine 176, is mixed with intake air received via intake passage 42 at a location upstream of throttle 20, and recirculated to engine intake manifold 25. Air compressed in intake passage 142 by smaller compressor 174 is then directed to intake passage 42, at a location upstream of larger compressor 74. Upon passage through compressor 74, the intake boost pressure may be further increased. While the depicted example shows the first and second turbochargers in a series configuration, it will be appreciated that in further embodiments, other arrangements, such as a parallel configuration, may be possible.

Figure 5:
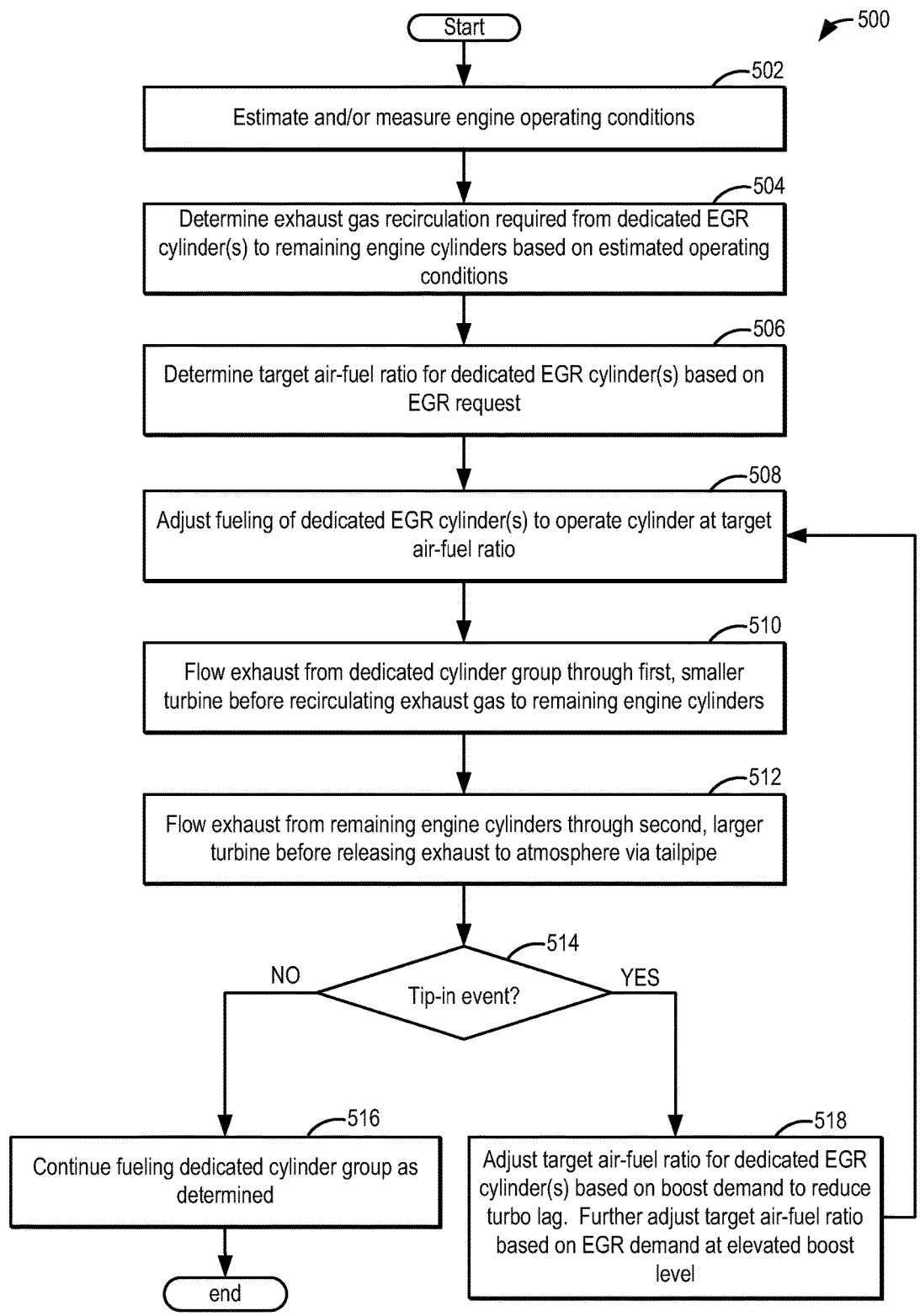
FIG. 5 shows an example method for adjusting fueling of the engine cylinders to enable boost control.

As elaborated at FIG. 5, by adjusting the air-fuel ratio of exhaust discharged from the dedicated EGR cylinder, turbine spin-up and boost pressure control may be expedited. For example, during engine idling conditions when little to no EGR is demanded, the dedicated EGR cylinder group may be operated leaner than stoichiometry so that the EGR recirculated to the engine intake has a higher fresh air content. During a tip-in to high boost, where engine dilution is required at the higher boost level, the dedicated EGR cylinder may be transitioned to operating richer than stoichiometry, the degree of richness based on the increase in boost pressure required, as well as the increase in engine dilution required. Alternatively, the dedicated EGR cylinder group may be fueled at stoichiometry while one or more post fuel injections (e.g., fuel injections in the exhaust stroke) are included to allow for an exotherm at the downstream turbine. In an alternate example, during engine idling conditions when EGR is demanded, the dedicated EGR cylinder group may be operated richer than stoichiometry so that hydrogen enriched exhaust gas can be recirculated to the engine intake. During a tip-in to high boost, where no engine dilution is required at the higher boost level, the dedicated EGR cylinder may be transitioned to operating leaner than stoichiometry, the degree of leanness based on the increase in boost pressure required, as well as the decrease in engine dilution required.

Exhaust from exhaust manifold 36 is directed to turbine 76 to drive the turbine. When reduced turbine torque is desired, some exhaust may be directed instead through a wastegate (not shown), by-passing the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap NO from the exhaust flow when the exhaust flow is lean, and to reduce the trapped NO when the exhaust flow is rich. In other examples, an exhaust after-treatment catalyst may be configured to disproportionate NO or to selectively reduce NO with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow. All or part of the treated exhaust from emission control device 170 may be released into the atmosphere via exhaust conduit 35.

Engine system 100 further includes a control system 14. Control system 14 includes a controller 12, which may be any electronic control system of the engine system or of the vehicle in which the engine system is installed. Controller 12 may be configured to make control decisions based at least partly on input from one or more sensors 16 within the engine system, and may control actuators 81 based on the control decisions. For example, controller 12 may store computer-readable instructions in memory, and actuators 81 may be controlled via execution of the instructions. Example sensors include MAP sensor 124, MAF sensor 55, exhaust gas temperature and pressure sensors 128 and 129, and exhaust gas oxygen sensors 51, 126. Example actuators include throttle 20, fuel injector 66, diverter valve 52, etc. Additional sensors and actuators may be included, as described in FIG. 2. Storage medium read-only memory in controller 12 can be programmed with computer readable data representing instructions executable by a processor for performing the methods described below, as well as other variants that are anticipated but not specifically listed. Example methods and routines are described herein with reference to FIG. 3.

Referring to FIG. 2, internal combustion engine 10 comprises a plurality of cylinders as shown in FIG. 1, one cylinder of which is described now. Engine 10 includes combustion chamber 30 and cylinder walls 132 with piston 136 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 144 and exhaust manifold 148 via respective intake valve 152 and exhaust valve 154. Each intake and exhaust valve may be operated independently by an intake cam 151 and an exhaust cam 153. Intake valve adjuster 85 advances or retards the phase of intake valve 152 relative to a position of crankshaft 40. Additionally, intake valve adjuster 85 may increase or decrease an intake valve lift amount. Exhaust valve adjuster 83 advances or retards the phase of exhaust valve 154 relative to a position of crankshaft 40. Further, exhaust valve adjuster 83 may increase or decrease an exhaust valve lift amount. The position of intake cam 151 may be determined by intake cam sensor 155. The position of exhaust cam 153 may be determined by exhaust cam sensor 157. In cases where combustion chamber 30 is part of a dedicated EGR cylinder, the timing and/or lift amount of valves 152 and 154 may be adjusted independently of other engine cylinders so that the cylinder air charge of the dedicated EGR cylinder may be increased or decreased relative to other engine cylinders. In this way, external EGR supplied to engine cylinders may exceed twenty five percent of the cylinder charge mass. External EGR is exhaust that is pumped out of exhaust valves of a cylinder and returned to cylinders via cylinder intake valves. Further, the internal EGR amount of cylinders other than the EGR cylinder may be adjusted independently of the dedicated EGR cylinder by adjusting valve timing of those respective cylinders. Internal EGR is exhaust that remains in a cylinder after a combustion event and is part of a mixture in the cylinder for a subsequent combustion event.

Fuel injector 66 is shown positioned to inject fuel directly into cylinder 30, which is known to those skilled in the art as direct injection. Alternatively, fuel may be injected to an intake port, which is known to those skilled in the art as port injection. In some example engine configurations, one or more engine cylinders may receive fuel from both direct and port fuel injectors.

Intake manifold 144 is shown communicating with optional electronic throttle 162 which adjusts a position of throttle plate 164 to control air flow from air intake 42 to intake manifold 144. In some examples, throttle 162 and throttle plate 164 may be positioned between intake valve 152 and intake manifold 144 such that throttle 162 is a port throttle. Driver demand torque may be determined from a position of accelerator pedal 180 as sensed by accelerator pedal sensor 184. A voltage or current indicative of driver demand torque is output from accelerator pedal sensor 184 when driver's foot 182 operates accelerator pedal 180.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 148 upstream of catalytic converter 170. Alternatively, a two-state exhaust gas oxygen sensor may be substituted for UEGO sensor 126.

Converter 170 can include multiple catalyst bricks, in one example. In another example, multiple emission control devices, each with multiple bricks, can be used. Converter 170 can be a three-way type catalyst in one example.

Controller 12 is shown in FIG. 2 as a conventional microcomputer including: microprocessor unit 102, input/ output ports 104, read-only (non-transitory) memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 213; a measurement of engine manifold pressure (MAP) from pressure sensor 122 coupled to intake manifold 44; an engine position sensor from a Hall effect sensor 115 sensing crankshaft 40 position; a measurement of air mass entering the engine from sensor 219; and a measurement of throttle position from sensor 158. Barometric pressure may also be sensed (sensor not shown) for processing by controller 12. In a preferred aspect of the present description, engine position sensor 115 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 144, and piston 136 moves to the bottom of the cylinder so as to increase the volume within combustion chamber 30. The position at which piston 136 is near the bottom of the cylinder and at the end of its stroke (e.g. when combustion chamber 30 is at its largest volume) is typically referred to by those of skill in the art as bottom dead center (BDC). During the compression stroke, intake valve 152 and exhaust valve 154 are closed. Piston 136 moves toward the cylinder head so as to compress the air within combustion chamber 30. The point at which piston 136 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 136 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

Thus the components of FIGS. 1-2 provides for an engine system that allows for operating a dedicated EGR cylinder group with more blow-through air than remaining engine cylinders and rich cylinder combustion, the dedicated EGR cylinder group recirculating exhaust gas to an engine intake via a first turbine, the first turbine distinct from a second turbine receiving exhaust gas from remaining engine cylinders. A degree of richness of the rich cylinder combustion may be adjusted based on one or more of boost demand at the tip-in, cylinder combustion stability, and engine dilution requirement (or EGR demand).

The system further allows for adjusting of an air-fuel ratio of exhaust gas recirculated from a dedicated cylinder group to an engine intake via the first turbine, responsive to an operator pedal tip-in, the adjusting based on boost demand at the tip-in. The air-fuel ratio of the dedicated cylinder group is further adjusted based on EGR demand at the tip-in. For example, the dedicated cylinder group may be transitioned from operating leaner than stoichiometry at idling conditions to being enriched responsive to a tip-in event to expedite delivery of boost and delivery of EGR at the elevated boost. As another example, the dedicated cylinder group may be transitioned from operating richer than stoichiometry at idling conditions to being enleaned responsive to a tip-in event to expedite delivery of boost and reduction of engine dilution at the elevated boost.

Figure 3:
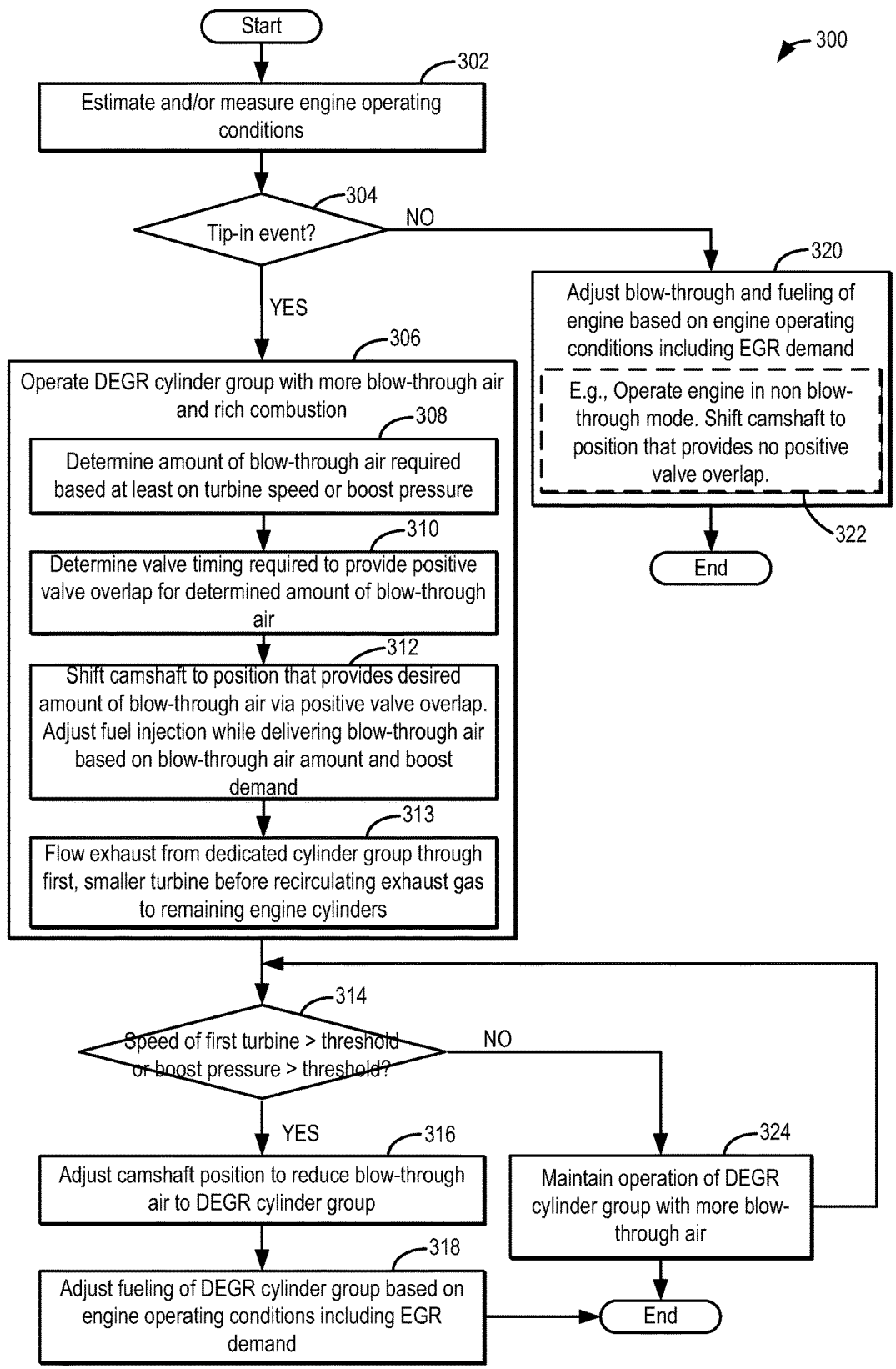
FIG. 3 shows an example method for selectively increasing delivery of blow-through air to a dedicated EGR cylinder group to reduce turbo lag.

Turning now to FIG. 3, an example method 300 is shown for selectively operating a dedicated EGR cylinder group of a multi-cylinder engine in a blow-through mode wherein blow-through air is provided using positive valve overlap. Fueling is concurrently adjusted to the dedicated EGR cylinder group based on the amount of blow-through air so as to provide a local exotherm at a turbine coupled downstream of the dedicated EGR cylinder group. In this way, turbo lag is reduced.

At 302, the method includes estimating and/or measuring engine operating conditions. These may include, for example, engine speed, load, boost, MAP, intake air flow, ambient conditions such as ambient pressure, humidity, operator torque demand, exhaust temperature, turbine speed, intake manifold pressure (MAP), boost pressure, pedal position, vehicle speed, engine dilution requirement, etc.

At 304, it may be determined if a tip-in event has occurred. A tip-in event may be confirmed based on a change in operator pedal position. As such, responsive to the tip-in event, there may be a rapid increase in boost demand. If a tip-in event is not confirmed, at 320, an amount of blow-through air and an amount of fueling to be applied to the engine may be determined based on engine operating conditions including at least EGR demand and combustion stability. For example, at 322, the engine may be operated in a non blow-through mode with no blow-through air being delivered. In the non blow-through mode, the camshaft position of the dedicated EGR (DEGR) cylinder group and the remaining non DEGR cylinder group may be adjusted so that no positive valve overlap is provided. In other examples, when operating in the non blow-through mode, non-zero positive valve overlap may be provided and valve overlap may be reduced such that blow through is negligible. In addition, fueling may be adjusted based on EGR demand and combustion stability. For example, as the EGR demand increases, fueling of the DEGR cylinder group may be adjusted. In addition, when the engine is combustion stability limited, the DEGR cylinder group may be enriched so as to generate hydrogen-enriched exhaust that is recirculated from the DEGR cylinder group to the engine intake. As such, the hydrogen enriched EGR improves the combustion stability limit and EGR tolerance of the engine. Thus, as the EGR demand increases, the richness of fueling the DEGR cylinder may be increased, while the fueling of the remaining engine cylinders may be correspondingly enleaned so that a net stoichiometric exhaust is delivered at the tailpipe.

At 306, the routine includes, responsive to the operator pedal tip-in, operating the dedicated EGR cylinder group with more blow-through air and rich cylinder combustion. As elaborated at FIGS. 1-2, the dedicated EGR cylinder group is configured to recirculating exhaust gas to the engine intake via a first turbine, the first turbine distinct from a second turbine receiving exhaust gas from the remaining engine cylinders. Operating the DEGR cylinder group with more blow-through air includes operating the DEGR cylinder group with more blow-through air than remaining engine cylinders. Furthermore, it includes operating the DEGR cylinder group with more blow-through air than it was previously operating with.

The operating includes, at 308, determining an amount of blow-through air required in the DEGR cylinder group based at least on the turbine speed of the first turbine. For example, as a difference between the current speed of the first turbine and a threshold speed increases, a larger amount of blow-through air may be required to spin-up the first turbine. The blow-through air amount may alternatively be based on one or more of boost pressure, a rate of change of boost, mass air flow rate, and engine speed.

Operating with blow-through further includes, at 310, determining a valve timing required to provide the desired amount of blow-through air in the DEGR cylinder group via positive valve overlap. Thus, operating the dedicated EGR cylinder group with more blow-through air includes operating the dedicated EGR cylinder group with more valve overlap. For example, the valve timing may be currently at a first valve timing that corresponds to no positive valve overlap or lower positive valve overlap. The controller may be configured to determine a second valve timing corresponding to higher positive overlap (e.g., full or maximum positive valve overlap). In addition, the controller may determine a variable cam timing (VCT) adjustment required to shift the valve timing from the initial valve timing to the final valve timing corresponding to increased positive valve overlap so that the determined amount of blow-through air can be provided through the cylinders. The determined VCT adjustment may include a camshaft position adjustment for the intake valve and/or the exhaust valve.

Next, at 312, operating in the blow-through mode includes adjusting the variable cam timing device to shift a camshaft position, thereby adjusting an intake and/or exhaust valve timing of the engine cylinder(s) from a first valve timing corresponding to no positive valve overlap (or lower positive valve overlap) to a second valve timing corresponding to positive intake valve to exhaust valve overlap (e.g., increased or full positive valve overlap). Then, once the valve timing has been adjusted, intake air may be directed from the intake manifold, downstream of a compressor, to the first turbine, downstream of the DEGR cylinder group, via positive overlap through the cylinder(s) of the DEGR cylinder group.

In addition, while delivering the blow-through air, a fuel injection amount to the DEGR cylinder group may be adjusted based on the amount of blow-through air directed via positive valve overlap so as to adjust an air-to-fuel ratio of cylinder combustion to be richer than stoichiometry. For example, fuel injection of the DEGR cylinder group may be temporarily enriched to provide a rich cylinder combustion, wherein a degree of richness of the rich cylinder combustion is based on one or more boost demand at the tip-in and cylinder combustion stability. For example, the degree of richness of the rich cylinder combustion may be increased as the boost demand increases. Further, the degree of richness of the rich cylinder combustion may be higher when there is boost demand and cylinder combustion instability while the degree of richness may be lower when there is boost demand and cylinder combustion stability. By increasing the degree of richness as the cylinder combustion instability increases, hydrogen enriched exhaust can be recirculated to the engine, improving EGR tolerance and reducing combustion instability. In addition, by using a rich cylinder combustion in combination with the blow-through air, an exotherm is generated at the first turbine downstream of the DEGR cylinder group. This increases the temperature and pressure of exhaust at the first turbine, expediting turbine spin-up, and reducing turbo lag. Example, blow-through air and fuel combinations are described at FIG. 4.

It will be appreciated that fueling of the remaining cylinders may be concurrently adjusted based on the air-fuel ratio of the EGR received so as to maintain an overall stoichiometric exhaust at the tailpipe.

In still further examples, instead of enriching the combustion in the DEGR cylinder, the cylinder may be fueled at stoichiometry with one or more post fuel injections included based on the amount of blow-through air delivered. The post fuel injections result in a rich combustion at the turbine downstream of the DEGR cylinder, decreasing turbo lag.

At 313, the routine includes flowing exhaust from the DEGR cylinder group through the first turbine before recirculating the exhaust to all the engine cylinders. As described in FIG. 1, the first turbine is a first, smaller turbine coupled to a first, smaller intake compressor while the second turbine is a second, larger turbine coupled to a second, larger intake compressor, the first compressor positioned upstream of the second compressor in the engine intake. Thus, by expediting spinning up of the first turbine, the first compressor is operated to provide at least a portion of the demanded boost pressure. In addition, eventual spin-up of the second turbine is improved, reducing turbo lag.

The operating with increased blow-through air and rich cylinder combustion is continued until sufficient boost has built up. For example, at 314, it may be determined if one of a turbine speed of the first turbine is above a threshold speed, and a boost pressure is above a threshold pressure. If enough boost pressure has not been developed, at 324, the routine includes maintaining operation of the dedicated EGR cylinder group with blow-through air and rich cylinder combustion. In addition, the routine includes maintaining recirculation of exhaust gas from the dedicated cylinder group to remaining engine cylinders during the tip-in, wherein exhaust gas from the dedicated cylinder group is delivered to a water gas shift catalyst coupled downstream of the dedicated cylinder group before recirculating the exhaust gas to each of the remaining engine cylinders via the first turbine.

If the turbine has spun up sufficiently and boost pressure has developed, at 316, the routine includes adjusting the camshaft position to reduce blow-through air to the DEGR cylinder group. Specifically, after the turbine speed of the first turbine is above the threshold speed, blow-through air through the dedicated EGR cylinder is reduced and fuel injection of the dedicated EGR cylinder group is adjusted based at least on EGR demand and combustion stability of the remaining engine cylinders. For example, the dedicated EGR cylinder group may be operated with a degree of richness based on EGR demand, the degree of richness of fuel injection to the dedicated EGR cylinder group increased as engine EGR demand increases or as the engine becomes combustion stability limited. The degree of richness used in the DEGR cylinder group during turbine spin-up (along with the use of blow-through air) may be different (e.g., higher) than the degree of richness used in the DEGR cylinder group during EGR delivery in the presence of combustion instability. Example rich injections are described at FIG. 4.

Turning now to FIG. 4, example combustion profiles 401-404 for a DEGR cylinder are shown at map 400. Each combustion profile depicts the amount of air delivered to the DEGR cylinder including air received during normal valve operation as well as additional blow-through air (where applicable). In addition, each combustion profile depicts the amount of fuel delivered to the DEGR cylinder.

A first combustion profile 401 is used during a first operating condition (condition 1) when EGR is requested, but combustion stability is not limited. Further, there is no additional boost demand. During such conditions, air (solid bar) is delivered to the DEGR cylinder during regular valve operation (e.g., in the intake stroke) and no additional blow-through air is delivered. Herein, due to no need for additional turbine spin-up, blow-through air is not required. Further, since engine combustion stability is not limited, hydrogen enriched EGR is not required. Thus, the DEGR cylinder is operated with fuel that is proportional to the air to provide a stoichiometric exhaust that is recirculated to the engine.

It will be appreciated that while the air and fuel is shown as proportional, it does not imply a 1:1 air:fuel ratio. Rather, it implies a ratio required to generate a stoichiometric mixture (e.g., 14.6:1 air:fuel). However, in alternate examples, the air:fuel ratio may be different (e.g., a 1:1 ratio) based on the desired air-to-fuel ratio of each mixture.

A second combustion profile 402 is used during a second operating condition (condition 2) when EGR is requested, but combustion stability is limited. Here, as in Condition 1, there is no additional boost demand. During such conditions, air (solid bar) is delivered to the DEGR cylinder during regular valve operation (e.g., in the intake stroke) and no additional blow-through air is delivered. Herein, due to no need for additional turbine spin-up, blow-through air is not required. However, since engine combustion stability is limited, hydrogen enriched EGR is required. Thus, the DEGR cylinder is operated with more fuel relative to air to provide a rich exhaust that is recirculated to the engine via the WGS catalyst where hydrogen enrichment of the exhaust occurs before recirculation. The degree of richness of the fuel injection is adjusted based on the EGR demand, the degree of richness increased as the EGR demand increases.

A third combustion profile 403 is used during a third operating condition (condition 3) when EGR is requested, but combustion stability is not limited. Further, there is an additional boost demand. During such conditions, air (solid bar) is delivered to the DEGR cylinder during regular valve operation (e.g., in the intake stroke) and an additional blow-through air amount (cross hatched bar) is also delivered. Herein, due to the need for additional turbine spin-up, blow-through air is required. The amount of blow-through air provided via positive valve overlap is based on the boost demand, the blow-through air amount increased as the boost demand increases. To enable an exotherm to be generated at the turbine coupled downstream of the DEGR cylinder, fueling of the DEGR cylinder is adjusted based on the blow-through air amount to provide a rich combustion. The richness of the combustion is adjusted based on the boost demand only since engine combustion stability is not limited, and since hydrogen enriched EGR is not required. In one example, the degree of richness of the rich combustion used for turbine spin up, as shown at profile 403, may be higher than the degree of richness of the rich combustion used for hydrogen enrichment of EGR, as shown at profile 402.

A fourth combustion profile 404 is used during a fourth operating condition (condition 4) when EGR is requested, but combustion stability is limited. Further, there is an additional boost demand. During such conditions, air (solid bar) is delivered to the DEGR cylinder during regular valve operation (e.g., in the intake stroke) and an additional blow-through air amount (cross hatched bar) is also delivered. Herein, due to the need for additional turbine spin-up, blow-through air is required. The amount of blow-through air provided via positive valve overlap is based on the boost demand to reduce turbo lag, the blow-through air amount increased as the boost demand increases. To enable an exotherm to be generated at the turbine coupled downstream of the DEGR cylinder, fueling of the DEGR cylinder is adjusted based on the blow-through air amount to provide a rich combustion. The richness of the combustion is adjusted based on the boost demand. In addition, the degree of richness is further adjusted due to engine combustion stability being limited, and since hydrogen enriched EGR is required. Specifically, the degree of richness of the rich combustion is adjusted to provide sufficient richness for generating hydrogen enriched exhaust as well as for generating a sufficiently hot exotherm at the turbine to enable turbo lag to be reduced. In one example, the degree of richness of the rich combustion used for turbine spin up and EGR delivery, as shown at profile 404, may be higher than the degree of richness of the rich combustion used for either turbine spin (as shown at profile 403) or for hydrogen enrichment of EGR (as shown at profile 402).

In one example, an engine system comprises an engine having an intake passage and an exhaust passage, a first and second cylinder group receiving aircharge from the intake passage, a first, faster actuating cam phaser coupled to cylinder valves of the first cylinder group, a second, slower actuating cam phaser coupled to cylinder valves of the second cylinder group and an EGR passage configured to recirculate exhaust from only the first cylinder group to the intake passage. The engine system further includes a first, smaller turbine positioned in the EGR passage, the first turbine driving a first compressor in the intake passage, and a second, larger turbine positioned in the exhaust passage downstream of the second cylinder group, the second turbine driving a second compressor positioned downstream of the first compressor in the intake passage. The engine system may further include a controller with computer-readable instructions for: during idling conditions, operating the first cylinder group with a first, smaller amount of blow-through air and at a first degree of rich combustion, the first degree based on engine EGR demand; and in response to a tip-in event, transitioning the first cam phaser to operate the first cylinder group with a second, larger amount of blow-through air and at a second, higher degree of rich combustion, the second degree based on boost demand at the tip-in event. The controller includes further instructions for, continuing operating the first cylinder group with the second, larger amount of blow-through air and at the second, higher degree of rich combustion for a duration until boost pressure is higher than a threshold. In addition, while operating the first cylinder group with the first or second amount of blow-through air, the controller may operate the second cylinder group with a third amount of blow-through air, smaller than each of the first and second amount of blow-through air.

Turning now to FIG. 5, an example method 500 is shown for adjusting operation of a dedicated EGR cylinder group and remaining engine cylinders of a multi-cylinder engine based on boost demand. The method allows turbo lag to be reduced without sacrificing EGR.

At 502, the routine includes estimating and/or measuring engine operating conditions such as engine speed, load, boost, MAP, intake air flow, ambient conditions such as ambient pressure, temperature, humidity, etc. At 504, an amount of exhaust gas recirculation (EGR) required may be determined based on engine operating conditions. Specifically, an amount of engine dilution required may be determined based on the engine operating conditions, and an EGR rate may be determined based on the required engine dilution. For example, a higher engine dilution may be requested at lower engine speeds and loads while a lower engine dilution may be requested at higher engine speeds and loads. As such, the EGR may be provided by recirculating exhaust from only the dedicated EGR cylinder group (for example, from only cylinder 4 of engine 10 in FIGS. 1-2) to all engine cylinders (to all of cylinders 1-4).

At 506, a target air-fuel ratio may be determined for operation of the dedicated EGR cylinder(s) based on the engine dilution requested. For example, when the EGR request is lower than a threshold, the dedicated EGR cylinder group may be operated leaner than stoichiometry. In another example, when the EGR request is higher than the threshold, the dedicated EGR cylinder group may be operated richer than stoichiometry. At 508, fueling of the dedicated EGR cylinder group may be adjusted to provide the target air-fuel ratio in the dedicated cylinder group. In one example, where enleaning of the dedicated EGR cylinder group is required based on a lower engine dilution demand, the enleaning may include fueling the dedicated EGR cylinder group (and not the remaining engine cylinders) leaner than stoichiometry, a degree of leanness adjusted to provide the requested amount of exhaust gas recirculation to the remaining engine cylinders. In another example, where enriching of the dedicated EGR cylinder group is required based on a higher engine dilution demand, the enriching may include fueling the dedicated EGR cylinder group (and not the remaining engine cylinders) richer than stoichiometry, a degree of richness adjusted to provide the requested amount of exhaust gas recirculation to the remaining engine cylinders. As discussed with reference to FIGS. 1-2, exhaust gas from the dedicated EGR cylinder group is delivered to a waster gas shift catalyst coupled downstream of the dedicated EGR cylinder group before recirculating the exhaust gas to each of the remaining engine cylinders. The water gas shift catalyst uses hydrocarbons from the exhaust of the dedicated EGR cylinders to create extra hydrogen. The hydrogen enriched exhaust is then recirculated to the engine intake. Thus, the hydrogen concentration of the exhaust gas received at the water gas shift catalyst from the dedicated EGR cylinder group is lower than the hydrogen concentration of the exhaust gas recirculated to each of the remaining engine cylinders from the water gas shift catalyst. By recirculating hydrogen rich EGR to the engine, a larger amount of engine dilution can be provided before incurring combustion stability issues. As the engine dilution required increases, the target air-fuel ratio of the dedicated EGR cylinder group may be enriched further so that the rich exhaust from the cylinders can be used by the WGS catalyst to generate hydrogen rich EGR. This is because combustion stability may be an issue during such conditions.

At 510, the routine includes recirculating exhaust gas from the dedicated EGR cylinder group to each of the remaining engine cylinders and the dedicated EGR cylinder group. In particular, exhaust is recirculated from only the dedicated EGR cylinder group to the engine intake manifold, upstream of the intake port of all the engine cylinders, via a first turbine. As such, the first turbine may be first, smaller turbine configured to selectively receive exhaust from only the dedicated EGR cylinder group (and not the remaining engine cylinders). The first, smaller turbine may be coupled to a first, smaller intake compressor. Thus, flow of exhaust from the dedicated cylinder group may spin the first turbine which then drives the first compressor. After passage through the first turbine, the exhaust gas may be recirculated to the remaining engine cylinders.

As such, the first turbine may be distinct from a second turbine receiving exhaust gas from remaining engine cylinders. At 512, the routine includes flowing exhaust from the remaining engine cylinders through the second turbine before releasing exhaust to the atmosphere via an exhaust tailpipe. The second turbine may be a second, larger turbine (larger than the first turbine) configured to selectively receive exhaust from only the non-dedicated EGR cylinder group (and not the dedicated EGR cylinder group). The second, larger turbine may be coupled to a second, larger intake compressor. In one example configuration, as shown at FIG. 1, where the first and second turbines are arranged in a series configuration, the first (smaller) intake compressor is positioned upstream of the second (larger) intake compressor in the engine intake. Thus, flow of exhaust from the non-dedicated cylinder group may spin the second turbine which then drives the second compressor. The second compressor compresses intake air compressed by the first compressor. In alternate arrangements, the turbines may be arranged in a parallel configuration.

At 514, it may be determined if there is a transient increase in boost demand. For example, it may be determined if there is an operator pedal tip-in event. An operator pedal tip-in event may be confirmed if an accelerator pedal is depressed by an operator to indicate a demand for higher boost and engine output. If an operator pedal tip-in event is not confirmed, at 516, the routine includes continuing fueling the dedicated cylinder group as determined. In addition, fueling of the remaining engine cylinders may be adjusted based on the fueling of the dedicated EGR cylinder group so as to maintain an overall engine exhaust air-fuel ratio at stoichiometry.

If an operator pedal tip-in event is confirmed, at 518, the routine includes adjusting an air-fuel ratio of exhaust gas recirculated from the dedicated EGR cylinder group to the engine intake via the first turbine responsive to the operator tip-in. In particular, the air-fuel ratio is adjusted based on boost demand at the tip-in, including a difference between boost pressure at the time of tip-in and the requested boost pressure. The air-fuel ratio is further adjusted based on an EGR demand at the tip-in. For example, the air-fuel ratio is further adjusted based on engine dilution required at the elevated boost level.

In one example, the adjusting includes transitioning from operating the dedicated cylinder group leaner than stoichiometry (during engine idling) to operating the dedicated cylinder group richer than stoichiometry responsive to the tip-in. Herein, the boost demand at the tip-in may be higher than a threshold boost and the EGR demand at the tip-in may be higher than a threshold dilution. The enriching may be based on an amount of heat required to spin up at least the first turbine, the degree of richness of the rich operation increased as the boost demand at the tip-in increases. The degree of richness of the rich operation may be further increased as the EGR demand at the tip-in increases. Further still, the controller may determine a first amount of richness required to spin-up the turbine to the elevated boost and a second amount of richness required to provide the determined engine dilution. The controller may then determine an amount of richness to apply by interpolating between the first and second amounts.

In another example, the adjusting includes transitioning from operating the dedicated cylinder group richer than stoichiometry (during engine idling) to operating the dedicated cylinder group leaner than stoichiometry responsive to the tip-in. Herein, the boost demand at the tip-in may be higher than the threshold boost and the EGR demand at the tip-in may be lower than the threshold dilution. The degree of leanness of the lean operation may be increased as the boost demand at the tip-in increases. The degree of leanness of the lean operation may be further increased as the EGR demand at the tip-in decreases. Further still, the controller may determine a first amount of leanness required to spin-up the turbine to the elevated boost and a second amount of leanness required to provide the determined engine dilution. The controller may then determine an amount of leanness to apply by interpolating between the first and second amounts.

After determining the revised target air-fuel ratio of the dedicated EGR cylinder group, the routine returns to 508 to accordingly adjust the fueling of the dedicated EGR cylinder group. In addition, fueling of the remaining engine cylinders may be adjusted based on the fueling of the dedicated EGR cylinder group so as to maintain an overall engine exhaust air-fuel ratio at or around stoichiometry. Exhaust from the dedicated EGR cylinder group may then be used to spin-up the first turbine and expedite boost pressure development. In this way, turbo lag is reduced.

Figure 6:
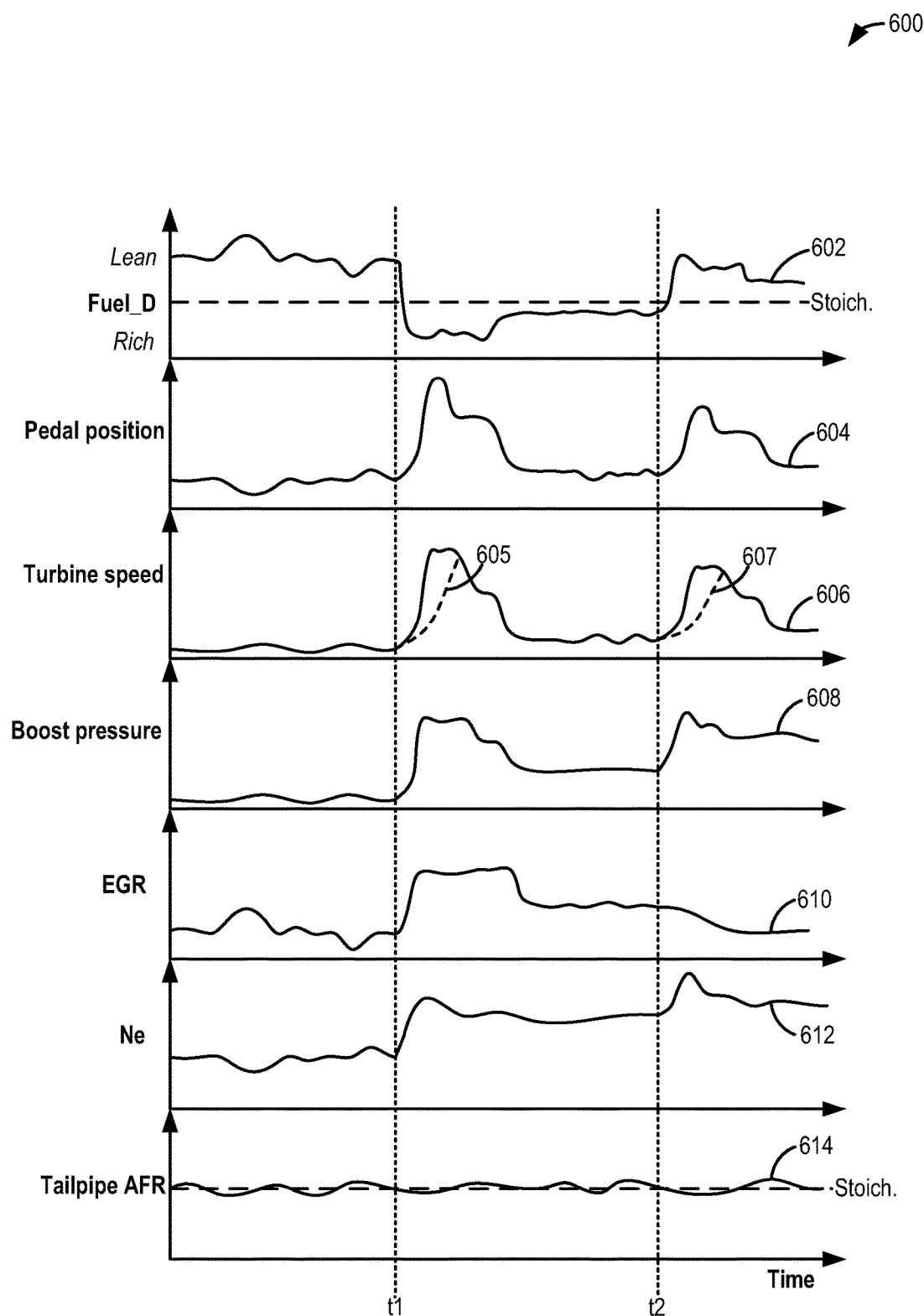
FIG. 6 shows an example fueling adjustment to dedicated and non-dedicated EGR cylinders of an engine system for boost control.

Now turning to FIG. 6, map 600 depicts an example adjusting of fueling to the dedicated and non-dedicated EGR cylinder group to allow for boost control. Map 600 depicts fueling of the dedicated cylinder group (Fuel D) at plot 602, an operator pedal position at plot 604, turbine speed at plot 606, boost pressure at plot 608, EGR flow at plot 610, engine speed at plot 612, and tailpipe air-fuel ration at plot 614. All plots are shown over time (along the x-axis).

Prior to t1, the engine may be at engine idling conditions with low engine speed. During these conditions, turbine speed may be low as boost demand and boost pressure may be low. For example, the engine may be operating with no boost. In addition, the engine dilution requirement may be low. Thus, the dedicated EGR cylinder may be operated leaner than stoichiometry with a degree of leanness adjusted as the engine dilution changes (but remains below a threshold level). As such, the fueling of the remaining engine cylinders may be adjusted based on the lean operation of the dedicated EGR cylinder so as to maintain a tailpipe exhaust air-fuel ratio of the engine around stoichiometry.

At t1, a pedal tip-in event may occur. Based on the tip-in event, an increase in boost pressure requested is determined. In addition, based on the engine operating conditions, higher EGR is required at the elevated boost level. Thus, in response to the tip-in event, the dedicated EGR cylinder is enriched, the degree of richness adjusted based on the increase in boost pressure required and the increase in engine dilution required. As the boost pressure or EGR demand decreases, the degree of richness may be decreased. By shifting to the use of rich exhaust, turbine spin-up is expedited. As such, in the absence of the change in air-fuel ratio, turbine spin-up may have occurred slower, as shown by the dashed segment 605.

Between t1 and t2, engine idling conditions are resumed with higher engine dilution provided by the dedicated EGR cylinder operating rich. At t2, another pedal tip-in event may occur. The tip-in event at t2 may be a smaller tip-in event that the tip-in event at t1. Based on the tip-in event at t2, a smaller increase in boost pressure requested is determined. In addition, based on the engine operating conditions, lower EGR is required at the elevated boost level. Thus, in response to the tip-in event, the dedicated EGR cylinder is enleaned, the degree of leanness adjusted based on the increase in boost pressure required and the decrease in engine dilution required. As the boost demand decreases or EGR demand increases, the degree of leanness may be decreased. By shifting to the use of lean exhaust, turbine spin-up is expedited. As such, in the absence of the change in air-fuel ratio, turbine spin-up may have occurred slower, as shown by the dashed segment 607.

In this way, exhaust gas is selectively recirculated from a single cylinder to all engine cylinders and during a first condition, the single cylinder is operated leaner than stoichiometry during engine idling and in response to an operator pedal tip-in, the single cylinder is enriched. During a second, different condition, the single cylinder is operated richer than stoichiometry during engine idling and in response to an operator pedal tip-in, the single cylinder is enleaned. Herein, the tip-in during the first condition is a larger tip-in than the tip-in during the second condition. As another example, a boost demand at the tip-in during the first condition is higher than the boost demand at the tip-in during the second condition. Further, an engine dilution demand during boosted engine operation is higher during the first condition and lower during the second condition. As such, during each of the first and second conditions, the selective recirculation of exhaust gas from the single cylinder to all engine cylinders includes recirculating exhaust gas from the single cylinder group to an engine intake via a first, smaller turbine while exhaust gas from remaining engine cylinders is flowed through a second, larger turbine, the first turbine coupled to a first compressor positioned upstream of a second compressor coupled to the second turbine.

In another example, an engine system comprises an engine having an intake passage and an exhaust passage; a first and second cylinder group receiving aircharge from the intake passage; an EGR passage configured to recirculate exhaust from only the first cylinder group to the intake passage; a first, smaller turbine positioned in the EGR passage, the first turbine driving a first compressor in the intake passage; and a second, larger turbine positioned in the exhaust passage downstream of the second cylinder group, the second turbine driving a second compressor positioned downstream of the first compressor in the intake passage. The engine system further includes a controller with computer-readable instructions for: during idling conditions, operating the first cylinder group leaner than stoichiometry while operating the second cylinder group at or around stoichiometry; and in response to a tip-in event where engine dilution is requested at high boost levels, transitioning the first cylinder group to operating richer than stoichiometry for a duration until a boost pressure is higher than a threshold. A degree of richness of operating the first cylinder group richer than stoichiometry is based on a difference in boost pressure at the tip-in event from the threshold, and further based on the engine dilution requested. The degree of richness is increased as the difference increases and the engine dilution requested increases. In one example, the first cylinder group has a smaller number of cylinders than the second cylinder group.

In another example, a method for an engine, comprises: adjusting an air-fuel ratio of exhaust gas recirculated from a dedicated cylinder group to an engine intake via a first turbine responsive to an operator pedal tip-in, the first turbine distinct from a second turbine receiving exhaust gas from remaining engine cylinders. The adjusting may be based on boost demand at the tip-in. The adjusting may be further based on EGR demand at the tip-in. In this way, higher EGR rates and higher levels of engine boost can be provided concurrently, improving fuel economy.

As an example, during idle conditions, a dedicated EGR cylinder of a multi-cylinder engine may be operated leaner than stoichiometry. Exhaust from the cylinder may be passed through a water gas shift (WGS) catalyst coupled downstream of the cylinder for the purpose of creating hydrogen from the hydrocarbons in the exhaust. Hydrogen enriched exhaust from the dedicated EGR cylinder is then recirculated via an EGR passage to all the engine cylinders to improve combustion stability. In response to an operator pedal tip-in event, the dedicated EGR cylinder may be enriched. As such, exhaust from the dedicated EGR cylinder may be flowed through a first smaller turbine before the exhaust is recirculated to the remaining cylinders. By enriching the dedicated cylinder in response to the pedal tip-in, the enrichment may be used to expedite spin-up of the first turbine and reduce turbo lag. For example, the enrichment of the dedicated EGR cylinder may be adjusted based on a difference between the boost pressure at the time of the tip-in, and the boost pressure desired. Exhaust from the remaining cylinders is then directed to a second, larger turbine. The first turbine may be coupled to a first, smaller compressor coupled upstream of a second, larger compressor coupled to the second turbine. Thus by spinning up the first turbine using the rich exhaust, boost provided by the first and second compressors may be increased, reducing turbo lag.

In addition, the rich exhaust from the dedicated cylinder may be flowed, after the first turbine, through the WGS catalyst to increase hydrogen enrichment of the exhaust being recirculated to the remaining engine cylinders. This higher hydrogen content of the exhaust allows more EGR to be recirculated to the remaining engine cylinders before combustion stability is affected. As such, this allows for EGR to be provided while the engine is operating boosted.

In this way, exhaust energy from a dedicated EGR cylinder can be used to operate a dedicated turbine wheel and reduce turbo lag in a boosted engine system. By capturing the exhaust energy from the dedicated EGR cylinder, turbine spin-up can be achieved using a smaller turbine. In addition, turbo lag can be addressed even at lower engine speeds. Further, a reduction in exhaust temperature is achieved as the exhaust flows across the turbine before being recirculated. The resulting cooler EGR being recirculated to the engine intake enables slower combustion while also controlling knock on cylinders ingesting the EGR. This improves engine combustion stability. By enriching the dedicated EGR cylinder in response to a tip-in, while also providing blow-through air to the dedicated EGR cylinder, a rich combustion can be used to expedite turbine spin-up without degrading exhaust catalyst performance and while also enabling higher engine dilutions to be achieved at the higher boost level. In this way, EGR benefits can be extended over a wider range of operating conditions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle engine having engine cylinders divided into a first cylinder group of dedicated EGR cylinders and a second cylinder group of remaining cylinders of the engine, comprising:
   operating the dedicated EGR cylinder group of the engine with fueling adjusted so that an air-fuel ratio of cylinder combustion is richer than stoichiometry and with more blow-through air provided using positive intake to exhaust valve overlap than the remaining cylinders of the engine, the dedicated EGR cylinder group recirculating exhaust gas to an intake of the engine via a first turbine, the first turbine distinct from a second turbine receiving exhaust gas from the remaining engine cylinders, wherein the operating is responsive to a vehicle operator pedal tip-in.

2. The method of claim 1, wherein the engine is a boosted engine, and wherein a degree of richness of the richer than stoichiometry cylinder combustion is based on one or more of an engine boost pressure requested at the tip-in and cylinder combustion stability relative to a limit at the tip-in.

3. The method of claim 2, wherein the degree of richness of the richer than stoichiometry cylinder combustion is increased as the requested engine boost pressure increases.

4. The method of claim 2, wherein the degree of richness of the richer than stoichiometry cylinder combustion is higher when engine boost pressure is demanded and cylinder combustion is limited relative to a combustion stability limit, as compared to the degree of richness when engine boost pressure is requested and cylinder combustion stability is not limited relative to the combustion stability limit.

5. The method of claim 1, wherein intake and exhaust valves of the dedicated EGR cylinder group are coupled to a first cam phaser and wherein intake and exhaust valves of the remaining engine cylinders are coupled to a second cam phaser, the first cam phaser actuating relatively faster than the second cam phaser, and wherein operating the dedicated EGR cylinder group with more positive intake to exhaust valve overlap includes actuating the first cam phaser from a first position of reduced valve overlap to a second position of increased valve overlap.

6. The method of claim 1, wherein operating the dedicated EGR cylinder group with more positive intake to exhaust valve overlap includes operating the dedicated EGR cylinder group with full positive intake to exhaust valve overlap while operating the remaining engine cylinders with less than full positive intake to exhaust valve overlap.

7. The method of claim 1, wherein the first turbine is coupled to a first compressor in an intake passage of the engine and the second turbine is coupled to a second compressor in another intake passage of the engine, and wherein the operating is continued until one of a turbine speed of the first turbine is above a threshold speed, and a boost pressure in the intake of the engine is above a threshold pressure.

8. The method of claim 7, further comprising, after the turbine speed of the first turbine is above the threshold speed, reducing blow-through air through the dedicated EGR cylinder group and adjusting fuel injection of the dedicated EGR cylinder group based at least on an amount of EGR required in the engine and combustion stability of the remaining engine cylinders relative to a limit.

9. The method of claim 8, wherein adjusting fuel injection includes operating the dedicated EGR cylinder group with a degree of richness based on the amount of EGR required in the engine, the degree of richness of the fuel injection to the dedicated EGR cylinder group increased as the amount of EGR required in the engine increases.

10. The method of claim 1, wherein the first turbine has a smaller turbine wheel than a turbine wheel of the second turbine, and wherein the first turbine is coupled to a first intake compressor of the engine, and the second turbine is coupled to a second intake compressor of the engine, the first intake compressor positioned upstream of the second intake compressor in the intake of the engine.

11. The method of claim 1, further comprising maintaining recirculation of exhaust gas from the dedicated EGR cylinder group to the remaining engine cylinders during the tip-in, and wherein exhaust gas from the dedicated EGR cylinder group is delivered to a water gas shift catalyst coupled downstream of the dedicated EGR cylinder group before recirculating the exhaust gas to each of the remaining engine cylinders via the first turbine.

12. A method for a boosted engine of a vehicle, comprising:
selectively recirculating exhaust gas from a single cylinder of the engine to all engine cylinders of the engine to provide engine dilution;
controlling an engine output of the engine responsive to an operator pedal position indicative of driver demand torque, the operator pedal position including a position of an accelerator pedal actuated by an operator of the vehicle;
during a first condition, operating the single cylinder with an air-fuel ratio that is leaner than stoichiometry during engine idling and in response to a vehicle operator pedal tip-in, enriching the single cylinder to operate with an air-fuel ratio richer than stoichiometry;
during a second condition, operating the single cylinder with the air-fuel ratio richer than stoichiometry during engine idling, and in response to the vehicle operator pedal tip-in, enleaning the single cylinder to operate with the air-fuel ratio leaner than stoichiometry; and
during each of the first and second conditions, selectively recirculating exhaust gas from the single cylinder to all of the engine cylinders includes recirculating exhaust gas from the single cylinder to an engine intake via a first turbine of the engine while exhaust gas from remaining engine cylinders of the engine is flowing through a second turbine of the engine, larger than the first turbine, the first turbine coupled to a first compressor of the engine positioned upstream of a second compressor of the engine coupled to the second turbine.

13. The method of claim 12, wherein the vehicle operator pedal tip-in includes a change in the operator pedal position indicative of an increase in demanded boost pressure, and wherein the vehicle operator pedal tip-in during the second condition includes a smaller increase in demanded boost pressure than the vehicle operator pedal tip-in during the first condition.

14. The method of claim 12, wherein the engine dilution demanded during boosted engine operation is higher during the first condition than during the second condition.

15. An engine system, comprising:
an engine having an intake passage and an exhaust passage;
a pedal for estimating drive demanded torque;
a first and a second cylinder group receiving aircharge from the intake passage;
a first cam phaser coupled to cylinder valves of the first cylinder group;
a second cam phaser coupled to cylinder valves of the second cylinder group, the first cam phaser actuating faster relative to the second cam phaser;
an EGR passage configured to recirculate exhaust from only the first cylinder group to the intake passage;
a first turbine positioned in the EGR passage, the first turbine driving a first compressor in the intake passage;
a second turbine positioned in the exhaust passage downstream of the second cylinder group, the second turbine driving a second compressor positioned downstream of the first compressor in the intake passage, the first turbine having a smaller turbine wheel than a turbine wheel of the second turbine; and
a controller with computer-readable instructions for:
during engine idling conditions, operating the first cylinder group with a first amount of blow-through air provided via positive valve overlap and at a first degree of richness to provide a richer than stoichiometry combustion, the first degree of richness based on engine EGR demanded during the engine idling conditions; and
in response to a pedal tip-in event, transitioning the first cam phaser to operate the first cylinder group with a second amount of blow-through air, larger than the first amount, and at a second degree of richness, higher than the first degree of richness of the richer than stoichiometry combustion, the second degree of richness based on an engine boost pressure requested at the pedal tip-in event.

16. The system of claim 15, wherein the controller includes further instructions for:
continuing operating the first cylinder group with the second amount of blow-through air and at the second degree of richness for a duration until boost pressure in the intake passage of the engine is higher than a threshold pressure.

17. The system of claim 16, wherein the controller further comprises the computer-readable instructions for:
operating the second cylinder group with a third amount of blow-through air, smaller than each of the first and second amounts of blow-through air, while operating the first cylinder group with the first or second amount of blow through air.

\* \* \* \* \*